United States Patent [19]

Layton et al.

[11] Patent Number: 4,932,607
[45] Date of Patent: Jun. 12, 1990

[54] UNIVERSAL ERECTION AND PROCESSING SYSTEM FOR LAUNCHING A SPACE VEHICLE

[75] Inventors: Earl T. Layton, Littleton; Colin A. Harrison, Englewood, both of Colo.

[73] Assignee: Martin Marietta Corporation, Bethesda, Md.

[21] Appl. No.: 234,047

[22] Filed: Aug. 19, 1988

[51] Int. Cl.⁵ ............................................. B64F 1/04
[52] U.S. Cl. ...................................... 244/63; 414/679
[58] Field of Search .................. 244/63; 414/10, 679, 414/783, 919; 212/218, 219; 89/1.8, 1.805, 1.801

[56] References Cited

U.S. PATENT DOCUMENTS

| | | | |
|---|---|---|---|
| 2,882,795 | 4/1959 | Bergner et al. | 89/1.8 |
| 2,968,410 | 9/1961 | Hamilton et al. | 414/783 |
| 3,160,289 | 12/1964 | Leefer | 414/679 |
| 3,228,294 | 1/1966 | Hickman | 89/1.8 |
| 3,242,809 | 3/1966 | Bauer | 89/1.8 |
| 3,414,143 | 12/1968 | Scott | 212/219 |
| 4,344,592 | 8/1982 | Constantineseu | 89/1.805 |

FOREIGN PATENT DOCUMENTS 1092403  11/1967  United Kingdom ................ 212/218

OTHER PUBLICATIONS

Andrew Wilson, The Eagle Has Wings, 1982, p. 64.

Primary Examiner—Joseph F. Peters, Jr.
Assistant Examiner—Anne Sartelle
Attorney, Agent, or Firm—Edwin E. Greigg

[57] ABSTRACT

A universal spaceport for launching a space vehicle of any type. The spaceport includes a gantry crane, an erector, a launch pad launch mount adapter and an umbilical tower which is used for any type launch vehicle. The gantry is provided with drive trucks that drive the gantry as the erector is lifted about a pivot so that the crane lift is always vertical. The erector is adapted to support any launch vehicle so that the center line is common for each different type vehicle. The erector and umbilical tower are provided with vertically movable platforms which may be moved to any position along the launch vehicle. Further, a vertically movable support arm is provided for the umbilical. Unique launch mount adapters are provided to provide vehicle securing to common pad hold downs.

21 Claims, 7 Drawing Sheets

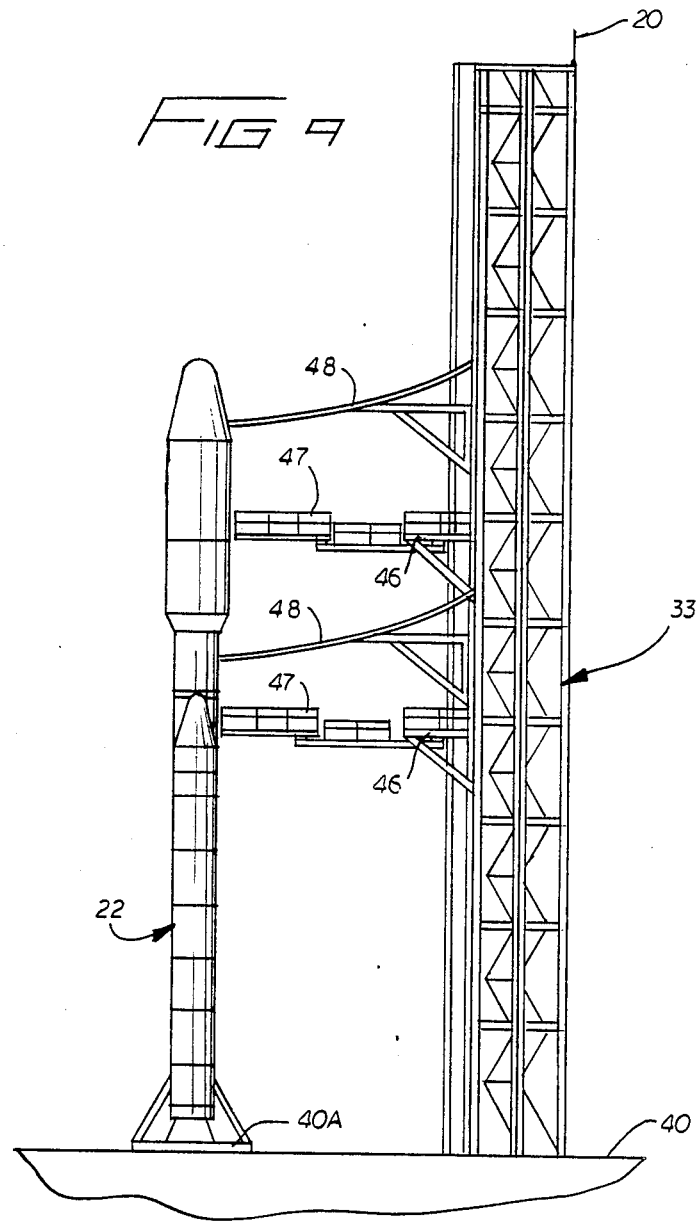

UNIVERSAL ERECTION AND PROCESSING SYSTEM FOR LAUNCHING A SPACE VEHICLE

TECHNICAL FIELD

This invention is directed to an erection assembly system for erecting and launching a space launch vehicle and more particularly to a universal erecting and processing system for launching a space vehicle.

BACKGROUND ART

Heretofore each different type of launch vehicle has required its own dedicated processing erecting and launch system. Therefore, the spaceport from which different types of vehicles have been launched requires a multiplicity of individual launch pads. That is, one launch pad for each different type vehicle.

Heretofore patents have been directed to erection and launch of missiles and space craft. Some such patents are U.S. Pat. Nos. 2,882,795; 2,968,410; 3,160,289; 3,228,294; 3,242,809; and 4,344,592.

DISCLOSURE OF INVENTION

It is therefore an object of this invention to provide a universal erection and processing system for erecting, moving and launching any type space vehicle from the same launch pad.

Another object is to provide an erector which will accomodate any well-known space propulsion-launch vehicle or its components, as well as to provide access for processing and servicing any space propulsion-launching vehicle.

Still another object is to provide a gantry which will lift an erector including a launch vehicle into place for launch while maintaining the lift cable in a vertical position throughout the lift process.

Yet another object is to provide an adapter and saddle support for securing any type of well-known space vehicle or it components to the universal transfer frame.

Yet another object is to provide a transfer frame for transporting any type of well-known space propulsion-launch vehicle which is movable onto an erector for erecting the space propulsion-launch vehicle.

While still another object is to provide a universal type umbilical tower for preparing and/or supplying utilities and commodities for any well-known space propulsion launch vehicle for launching into space.

These and other objects and advantages of this invention will be more clearly understood from a careful consideration of the drawings and a detailed description of the preferred embodiment.

BRIEF DESCRIPTION OF DRAWINGS

FIG. 9 is a side elevational view of the umbilical tower.

BEST MODE FOR CARRYING OUT THE INVENTION

Figure 1:
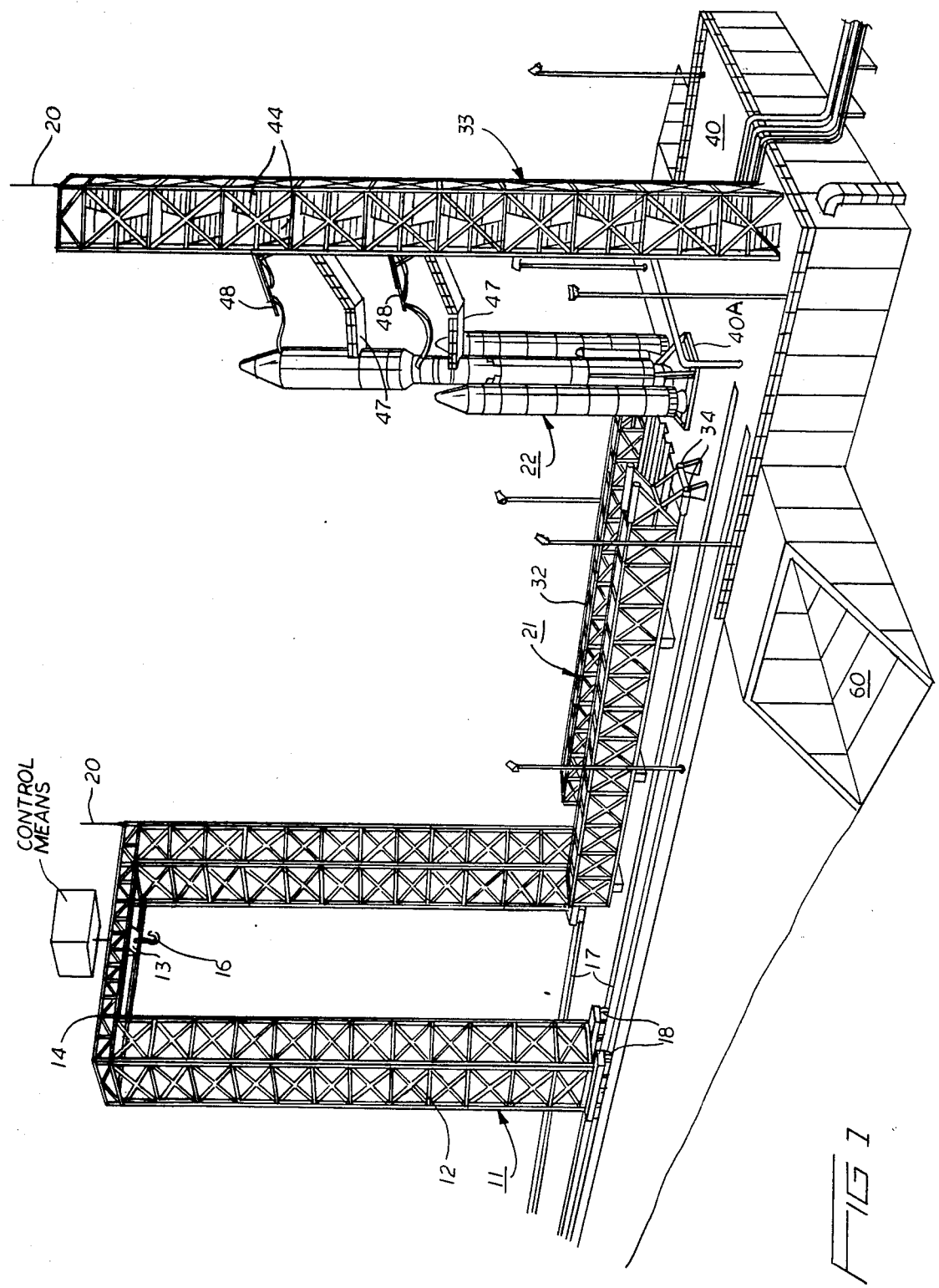
FIG. 1 illustrates the basic system including the gantry, the erector, the launch pad and the umbilical tower.

Now referring to the drawings in which like parts are designated by like reference characters there is shown in FIG. 1, a basic system illustrating the relative parts of the system. As shown, FIG. 1 illustrates a gantry crane 11 made of structural steel trusses 12 to form spaced parallel upright supports that supports an upper cross structure 14 that supports a movable crane 13 with an operating cab supported by the upper cross structure 14 of the gantry. The crane can be any well-known type capable of supporting the missile to be lifted and is controlled by unique controls including software programmed to keep the cables vertical as the launch vehicle is being lifted. The crane is movable along guide rails so that the lifting cable and hook 16 may be moved from side-to-side between the uprights of the gantry. The crane 13 is shown more clearly in FIG. 2 and the controls are shown in box-form in FIG. 1 for clarity. The gantry is driven along supporting tracks 17 by motor driven drive trucks 18. The tracks are supported in turn by structural cement of sufficient structure to support the gantry crane, erector 21 and launch vehicle 22. The term launch vehicle is meant to be any type of propulsion vehicle and space craft including the payload.

Figure 2:
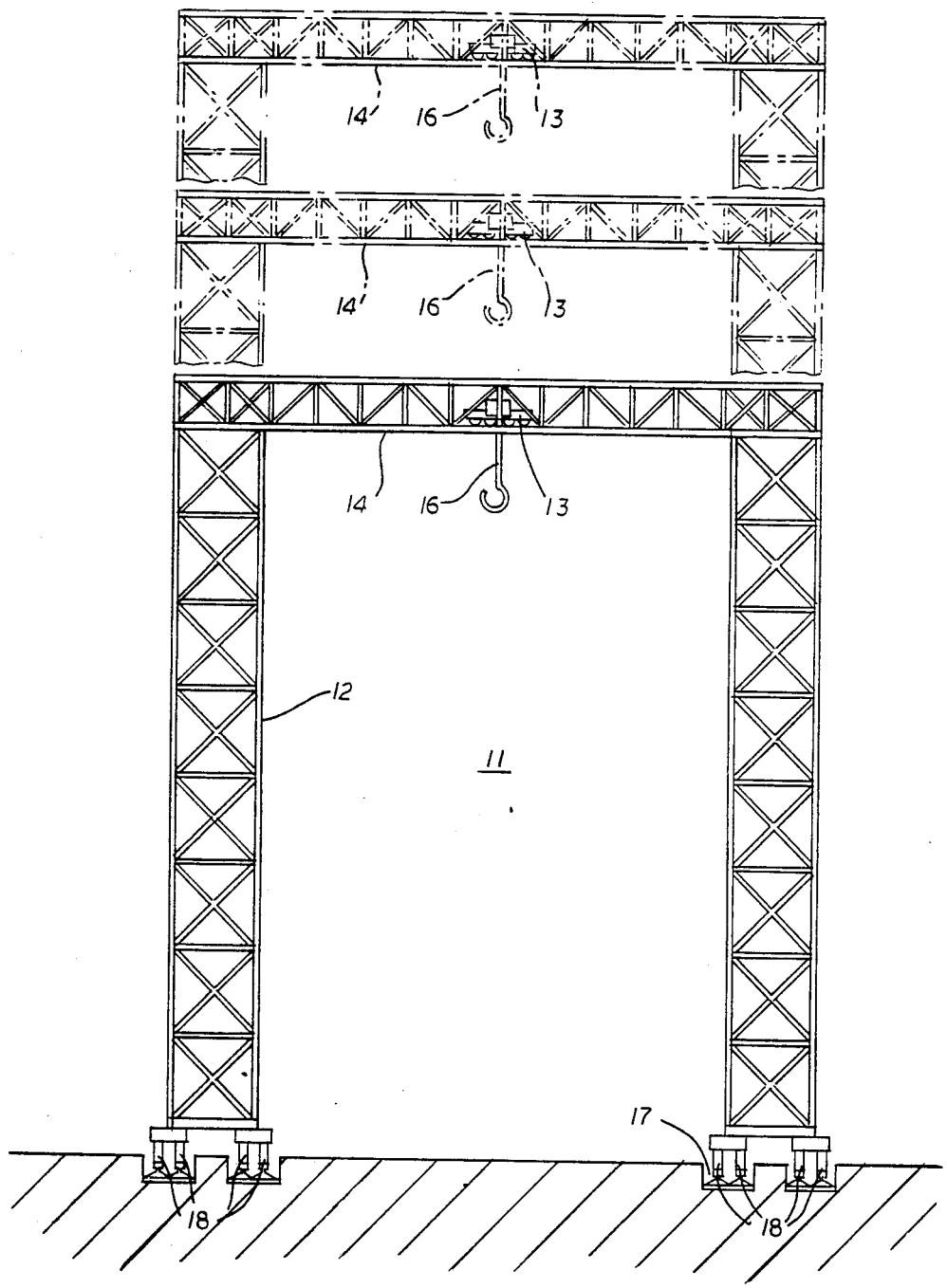
FIG. 2 illustrates a front elevation of the gantry crane illustrating the lift crane with the lift crane support located at three different heights.
Figure 3:
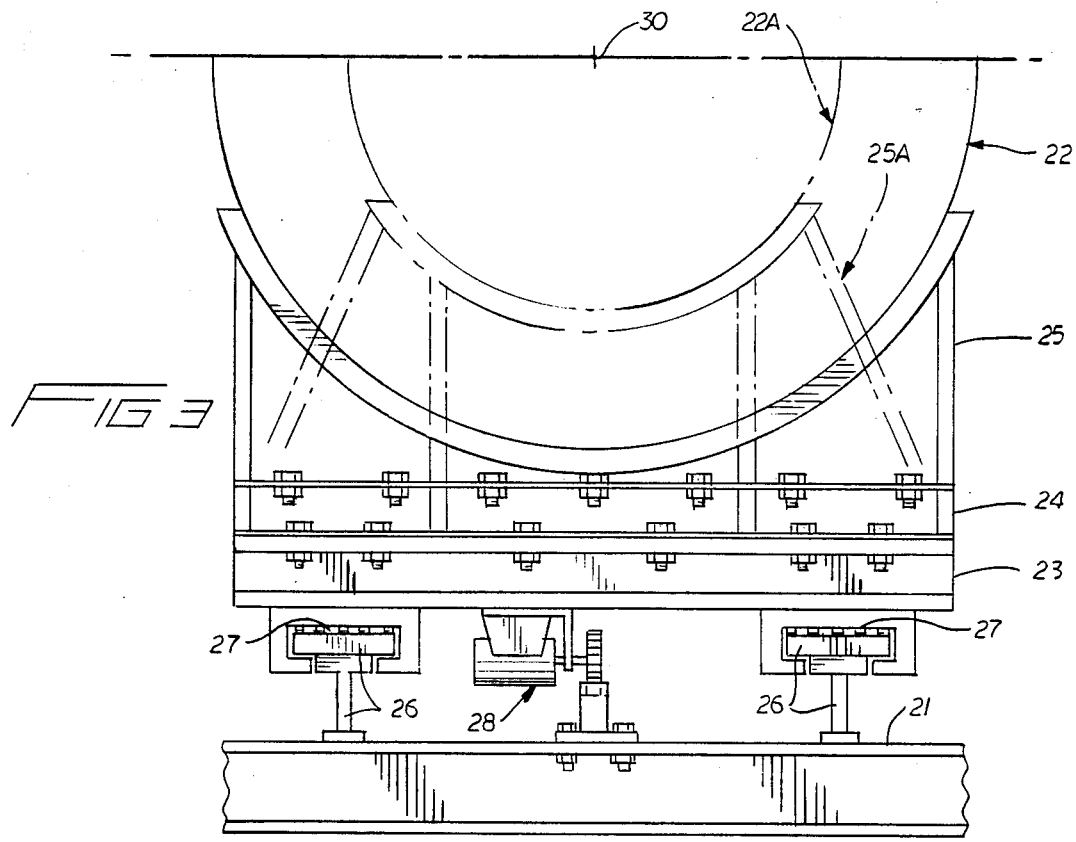
FIG. 3 illustrates an end view of the adaptor and a partial view of the erector and erector transfer frame.
Figure 5:
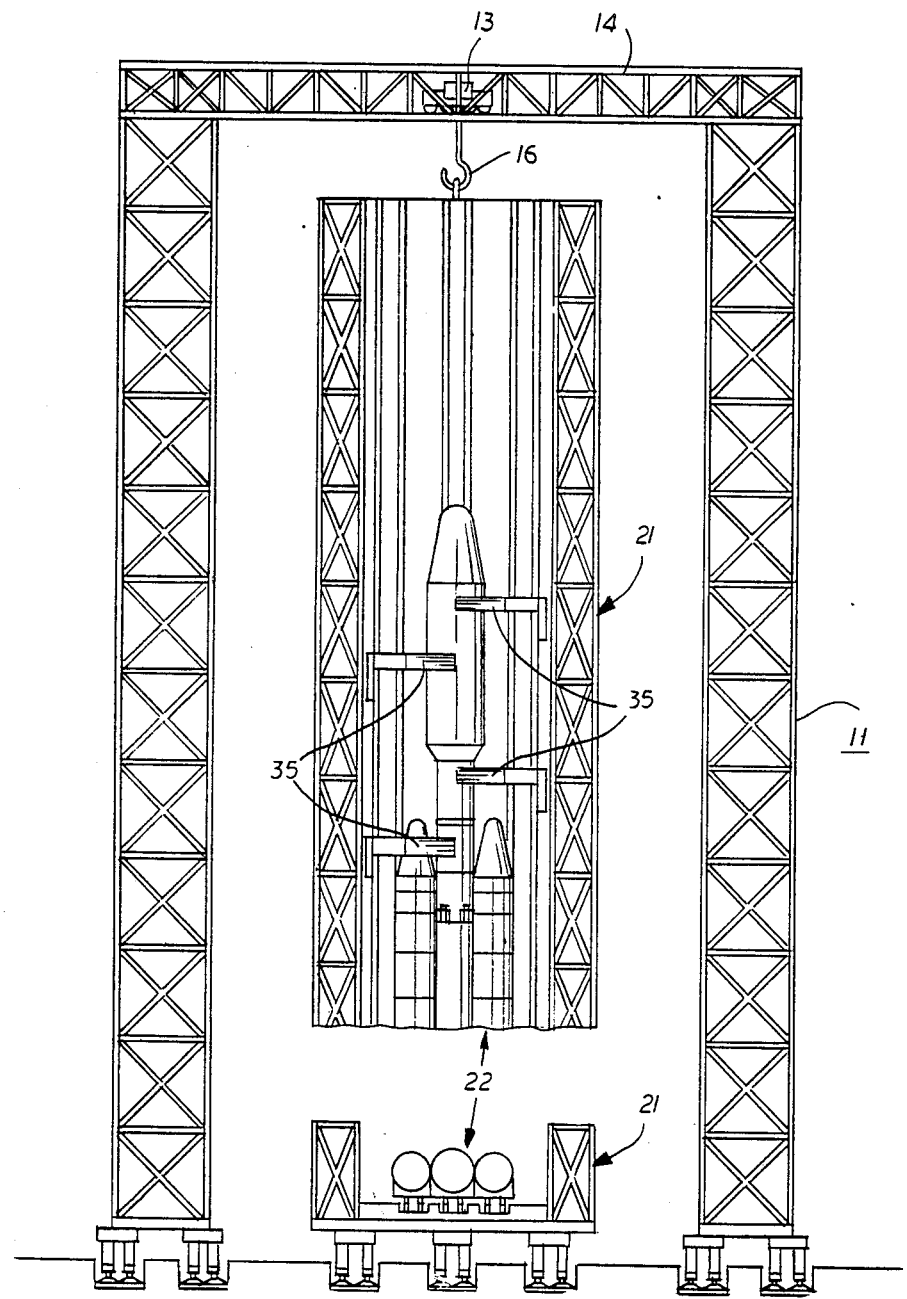
FIG. 5 illustrates a front elevation of the gantry crane and the erector raised to a vertical position with a launch vehicle raised to its launch position from a horizontal position, the launch vehicle is cut off at the bottom and is shown in the horizontal position below the cut off end.

FIG. 2 illustrates the gantry crane with the crane support 14 located at three different heights. The additional heights are formed by removing the crane with the upper cross structure and adding more sections to the gantry uprights. The height is determined by the height of the launch vehicle. FIG. 2 illustrates more clearly the guide tracks 17 and the drive trucks 18. The gantry crane as well as the other structures (erector and umbilical tower) may be provided with lighting rods as a protection against a lightning strike. The erector frame 21 is shown in simplified form in FIG. 1. FIG. 3 illustrates an end view of the erector frame including an erector transfer frame 23, an adapter frame 24 and a saddle support 25 which is unique to each launch vehicle. The erector transfer frame is standard equipment. However, the adapter and the saddle support is made special and unique to accomodate a specific type of launch vehicle so that each different launch vehicle is supported on the saddle support and the adapter will vary in depth to align the axis or center line of each different type launch vehicle along the same center line 30 as shown in FIG. 3. The adapter may have means for adjusting the saddle support for side-ways movement as well as for height. Thus, each different type of launch vehicle will be positioned with its axis on the exact same center 30 which will be the exact center of the launch pad when raised to a vertical position as shown in FIGS. 1, 5 and 9.

A different sized launch vehicle 22A and saddle support 25A have been shown in dotted lines to show the maintained center line 30.

Figure 4:
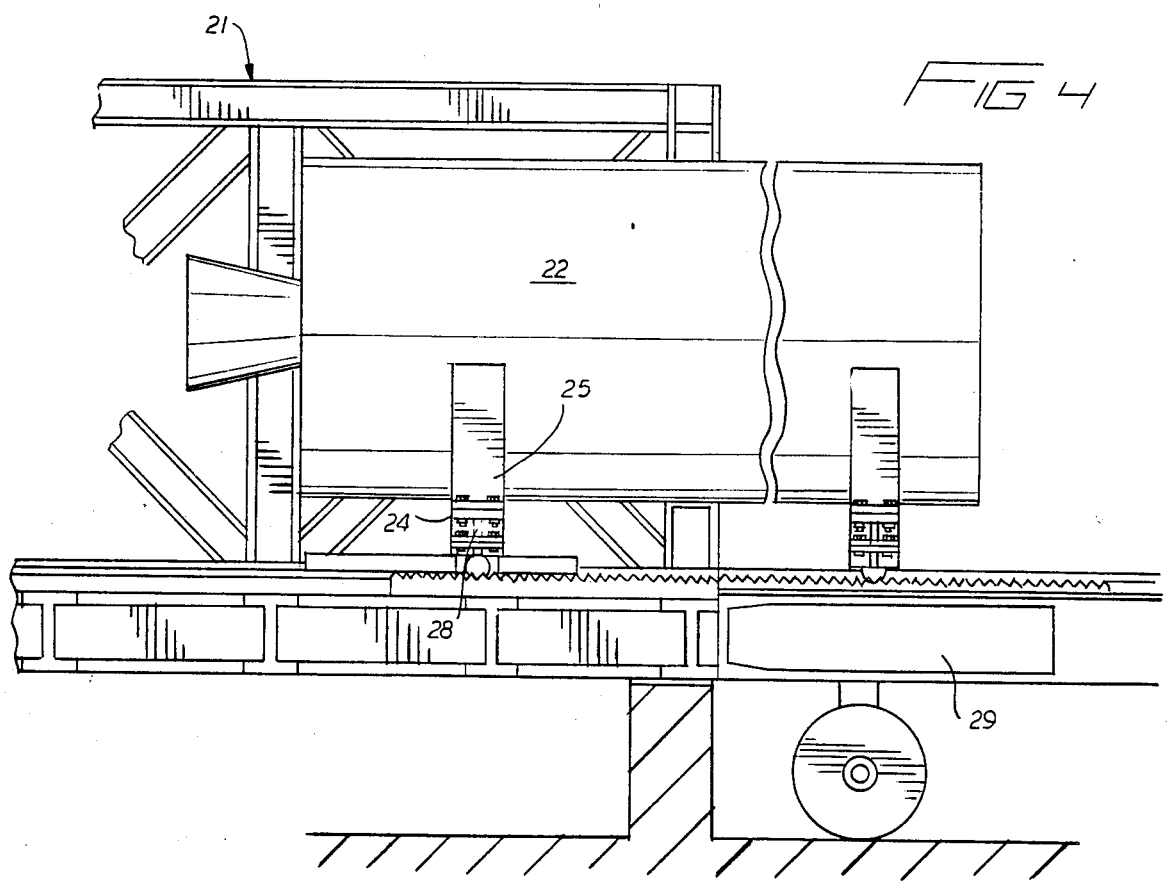
FIG. 4 illustrates a transfer of a launch vehicle from a transporter to the erector frame.

It is to be understood that the unique saddle support and adapter will be configured to support the type of launch vehicle to be used and will in turn be secured to the transfer frame Thus, a particular saddle support and adapter will be provided for each different type of launch vehicle The saddle support 25 for a particular type of launch vehicle will be secured to the adapter frame 24 which in turn is secured to an erector transfer frame and the particular launch vehicle can be placed on the saddle support at the factory so that the launch vehicle can be transported to the launch pad site by a transporter 29 and transfered to the launch vehicle erection structure 21 as shown in FIG. 4.

In order to transfer the erector transfer frame-launch vehicle onto the launch vehicle erection structure, the erection structure is provided with spaced supporting rails 26 on which supporting bearing type rollers 27 on the erector transfer frame are supported The supporting bearing type rollers are secured along the bottom of the erector transfer frame for movably supporting the erector transfer frame and the launch vehicle. A motorized drive system 28 located between the roller bearing supports is provided to move the launch vehicle from the transporter 29, as shown in FIG. 4, onto the erection structure as well as horizontally and vertically within the erection frame for components mating, if required. Roller bearing assemblies such as manufactured by Tychoway Bearings Company which are made for a linear motion type support may be used.

The erector transfer frame is made with spaced structural steel trusses such as set forth for the gantry. The formed structure extends outwardly from the base upon which the tracks 26 are secured to form erection frames 32. The erection structure is pivoted at the end toward the umbilical tower 33 by pivots 34, as seen in FIG. 1, two pivots are not shown since they are behind the launch vehicle. The pivots are positioned such that when a launch vehicle is positioned in the saddle support with its center line along the center 30 as shown in FIG. 3 and is raised to a vertical position, the axis of the launch vehicle will be on the center of the launch pad 40. As shown in FIG. 5, the erection structure is provided with vertically movable platforms 35 which can be moved along rails to any desired height relative to the erection structure and the launch vehicle. FIG. 5 illustrates the erector in the upright position which is shown cutoff at its bottom with an end view of the launch vehicle and erector shown in the parallel position below the cut-off section.

Figure 6:
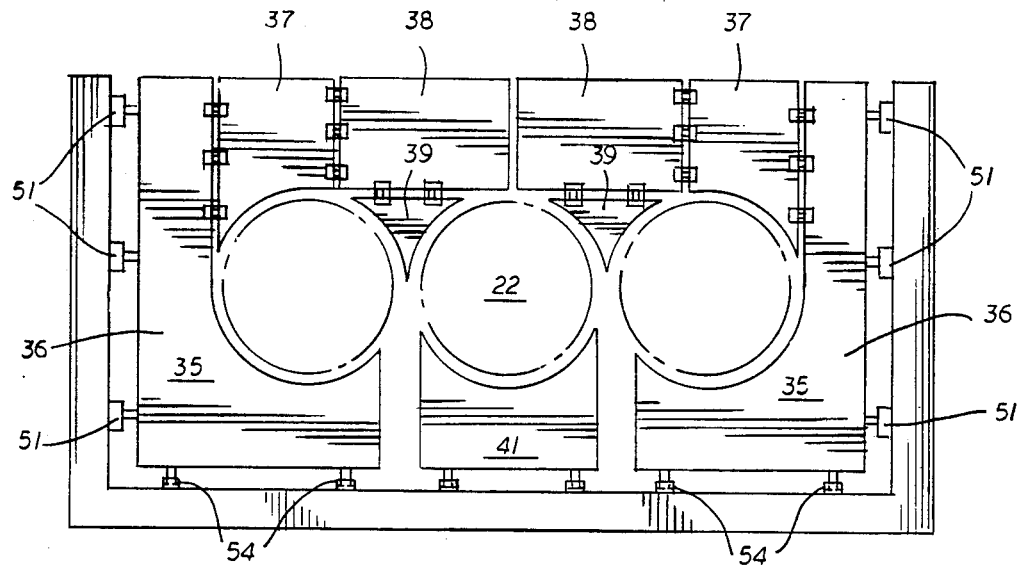
FIG. 6 illustrates a top plan view of a launch vehicle and the erector with mobile platforms shown in place relative to the launch vehicle.
Figure 7:
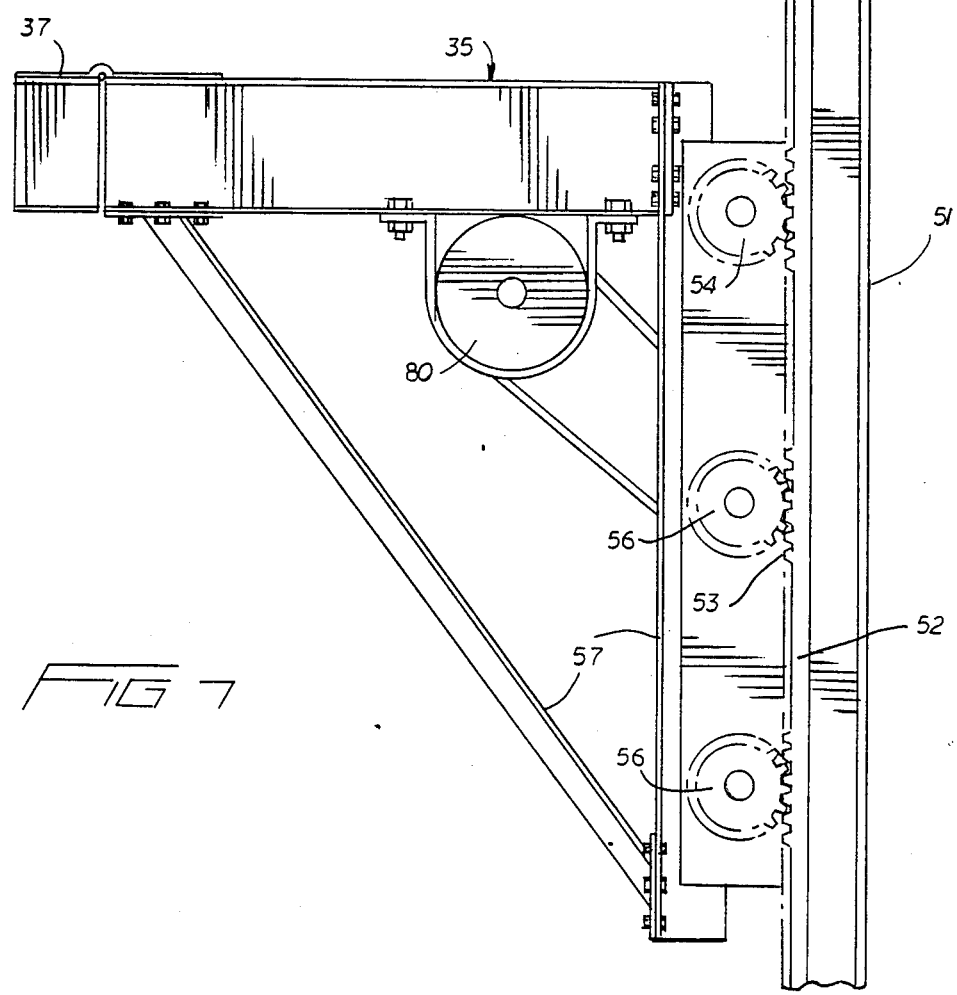
FIG. 7 illustrates a drive means for mobile platforms on the adapter as well as on the umbilical tower.

The platforms 35 as shown in FIG. 6 and 7 are provided with a portion 36 which is guided along guide rails 51 on the inside of the erector and are driven up and down along the guide rails by any suitable power drive which may include fixed rails 52 on the erector structure with teeth 53 thereon along which a gear wheel 54 having matching teeth 53 thereon is driven by a motor, not shown. Support gears 56 may be provided for supporting the platform supporting structure 57. A drive such as sold by the marine division of Letourneau may be used.

The platform 345 includes portions which fit between the erector structure and the launch vehicle and is provided with hinged portions 37, 38 and 39 that fit around portions of the launch vehicle on the sides opposite from the portion 35. The hinged portions are so assembled that portion 39 folds onto portion 38 and the portions 38 and 39 then fold onto portion 37 which fold onto portion 36. A mechanical drive driven by motor 80 may be used for automatically folding the hinged portions. Thus the launch vehicle may be reached from all sides. The shape of the platform parts are made to correspond with the shape of the particular launch vehicle used for the launch. FIG. 6 illustrates a top view of a platform supported by each of the erector frames and also a saddle support, adapter and transfer frame 41 supported by the inside of the erection structure. These platforms on each side of the erection structure may be driven by different drives which are synchronized to move together or the different platforms may be made to move separately by separate controls. FIG. 7 illustrates a drive means for the platforms. Of course the platform must be supported relative to the drive for vertical movement and in a horizontal position for use. The erection structure may be provided with an elevator, not shown, for lifting personnel and or supplies to a desired location along the launch vehicle. A utility compartment may also be provided for the electrical lines, etc.

Figure 8:
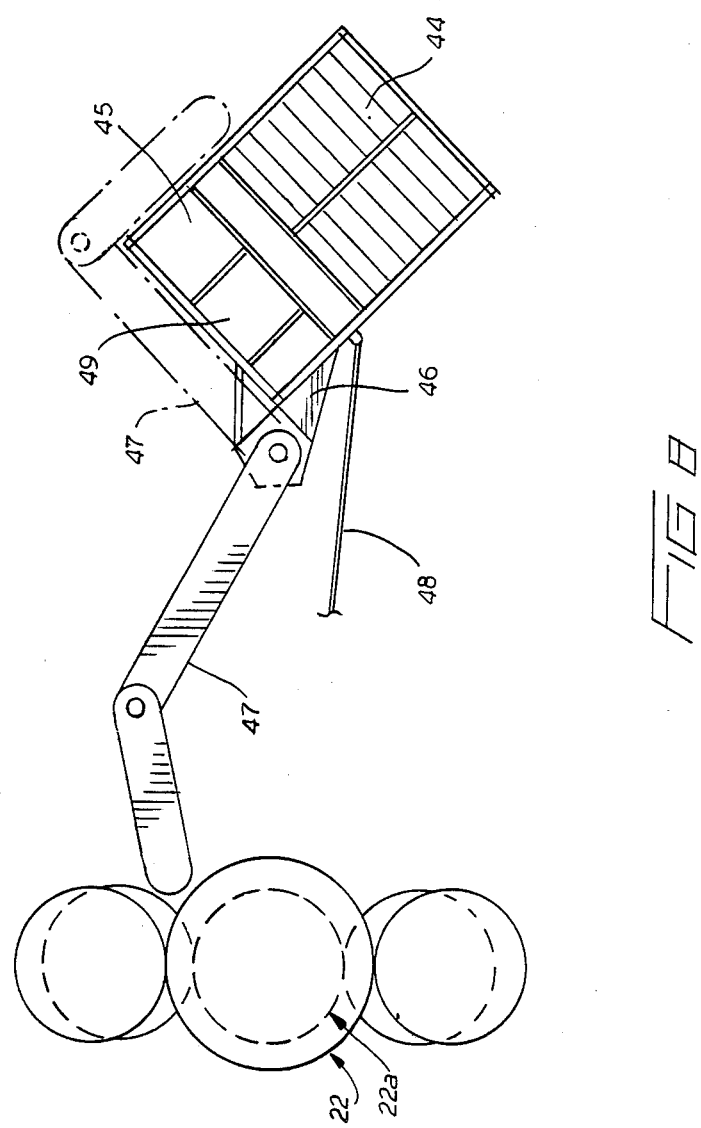
FIG. 8 illustrates a top view of the umbilical tower.

The umbilical tower is positioned relative to the launch pad 40 so that the launch vehicle will be centered on the launch pad adjacent the umbilical tower and a launch mount adapter 40A will be secured to common pad hold downs, not shown. The umbilical tower is provided with steps 44 for use by personnel and may be provided with an elevator 45, as shown in FIG. 8, which is a top view of the umbilical tower. The umbilical tower is provided with one or more movable platforms 46 which are driven up and down along the launch vehicle such as for the platforms 35 on the erection structure. The platforms 46 are provided with a double rotatable mechanically driven arm 47 as shown in FIGS. 1, 8 and 9 by which the launch vehicle may be reached from the platform on the umbilical tower. The platforms and arms support personnel and supplies and can be moved to any desired position along the height of the umbilical tower and the arms may be folded out to reach the launch vehicle. The arms are also shown in dotted lines in the stored position. Thus, the double rotating arms may be swung out toward the launch vehicle for access to the launch vehicle and then during launch or non-use periods, the arms may be stored alongside the umbilical tower as seen in FIG. 8. Also FIG. 8 shows a launch vehicle 22 of one diameter and a smaller diameter launch vehicle 22a in dotted lines.

In carrying out the invention the universal space port will include the gantry-crane 11, the erector structure 21, the launch pad 40, launch mount adapter 40A and the umbilical tower 33 assembled and ready for use. The launch vehicle 22 will be manufactured and loaded on a saddle support 25 of unique configuration which is secured to the adapter 24. The launch vehicle saddle support and adapter 24 are secured onto an erector transfer frame 23. The launch vehicle and/or components positioned on the saddle support-erector transfer frame will be transported to the space port by any suitable transport 29 shown in FIG. 4. With the propulsion end positioned toward the launch vehicle erection structure, the launch vehicle and/or components are loaded onto the launch vehicle erection structure and moved to its transfer position by the power driven drive system 28. Once in place, the adapter assembly is secured to the launch vehicle erection structure by any suitable means. The launch mount adapter 40A is secured on the propulsion end of the erection structure and secured to the launch vehicle before being raised to its vertical position. As shown in FIG. 3, the bearings support is angled around a portion of the track in order to prevent movement away from the track when raised to a vertical position.

The gantry-crane 11 is moved to a position such that the crane hook 16 is in a vertical position directly over the lift end of the launch vehicle erection structure. The crane lift hook is secured to the lift end of the launch vehicle erection structure and the crane begins to lift the launch vehicle and/or components erection structure with the launch vehicle thereon. When lifted, the erection structure will begin to pivot about the pivots 34. The crane lift drive, the crane movement drive, and the gantry drive, are all controlled by a sine - cosine control system means such that as the crane lifts the erection structure, the gantry will move, and if necessary the crane will move horizontally in order to maintain the lift cable in a vertical position. Since the gantry moves relative to the lifting movement of the cable the cable will always be in a vertical positon as the erection structure is lifted. Further digital position read-out meters are provided to indicate the exact position of the cable hook, horizontally and vertically.

As set forth above, the adapter is unique for the launch vehicle being used and is configured such that the center axis of the launch vehicle is always on a center line of the erection structure such that the center axis of the launch vehicle and launch mount adapter will be positioned on the center of the launch pad when the erection stucture has been lifted to a vertical position. Once the launch vehicle has been raised to its vertical position, the launch vehicle will be secured to the launch pad by the launch mount adapter and prepared for launching. If desired, the launch mount adapter 40A can be secured to the erector frame prior to vehicle and/or components installation, so that when installed, the vehicle and/or components can be secured to the launch mount adapter and then, lifted vertically and the launch mount adapter secured to the launch pad, when in place.

During preparation of the launch vehicle the erection structure is retained in the vertical position so that the vertically movable platforms 35 may be used by personnel to prepare the launch vehicle for launching. Once the launch vehicle has been lifted to its vertical position and set on the launch pad, the mobile platforms 46 on the umbilical tower may be moved to a desired position relative to the launch vehicle and the double rotation access arms 47 may be moved into place. Since the arms are mechanically controlled they can be moved to any desired position within the limits of their length.

The umbilical lines are supported by a powered support similar to the rotating arm drive system and includes an arm 48 so that the umbilical lines do not hang loose between the umbilical tower and the launch vehicle. Further during launch the umbilical lines will not fall loose over the entire length thereof. The platforms and umbilical support are shown more clearly in FIG. 9.

Once the launch vehicle has been prepared for launch, the erection structure is lowered to the ground by the gantry crane and the double rotating arms are moved to their stored position, as shown in FIG. 8. The launch vehicle is now ready for launching and can be launched as is well known in the art. Gases from firing the propulsion means is diverted out the underground opening 60 as shown in FIG. 1.

The above described system may be used for any launch vehicle by using a unique saddle support adapter configured for each different launch vehicle such that the axis of the launch vehicle is placed on the center of the launch pad by the erection structure. Further easy access to any part of the launch vehicle is made possible by the mobile platforms that can be raised or lowered to any desired position along the height of the launch vehicle. The umbilical support supports the umbilical lines to prevent flapping in the breeze and the gantry crane operation is such that the crane hook lifting the erection structure is always vertical and digital readouts indicate the exact location of the crane line and hook relative to the ground.

The erection system has been described for horizontal loading, it would be obvious that the launch vehicle erection structure may be used for vertically positioned launch vehicles. Further, the erection system may be used to lower a launch vehicle from a vertical position to a horizontal position, if desired.

Although the present invention has been described in the form of a particular specific embodiment, it will be appreciated by those skilled in the art that various alterations and re-arrangements may be made in the design without departing from the spirit and scope of the invention. It is intended that the appended claims be interpreted to cover all such modifications which fall within the spirit and scope of this invention.

We claim:

1. A universal erection and processing system from which any type of space launch vehicle may be launched which comprises:
    a separate saddle support arcuately configured to conform to an outer surface of a specific type of launch vehicle,
    a unique compatible adapter frame of a launch vehicle erection structure to which said saddle support is secured,
    said saddle support and adapter frame having a unique compatible structural configuration to support a launch vehicle of said specific type,
    said saddle support and adapter frame having a configuration of width and height which supports said launch vehicle with the center line of said launch vehicle on a center line relative to said launch vehicle erection structure, whereby the center of any specific type of launch vehicle will be aligned with a fixed center line of a launch pad when said launch vehicle is placed on said launch pad by said launch vehicle erection structure,
    a gantry crane for lifting said launch vehicle erection structure by a crane lift cable and hook,
    said gantry crane includes drive trucks which drive said gantry crane along supporting tracks as said launch vehicle erection structure is lifted by said lift cable in order to keep the lift cable in a vertical position.

2. A universal erection and processing system as set forth in claim 1, which includes:
    a unique configured launch mount adapter which is compatible with and secured to a propulsion end of said launch vehicle within said erection structure.

3. A universal erection and processing system as set forth in claim 1, in which:
    said launch vehicle erection structure pivoted about a pivot on an end thereof juxtaposed said launch pad so that in a vertical position any type launch vehicle supported by a compatible saddle support and adapter is aligned with a center line of said launch pad.

4. A universal erection and processing system as set forth in claim 2, in which:
said launch vehicle erection structure is pivoted about a pivot on an end thereof juxtaposed said launch pad so that in a vertical position any type launch vehicle supported by a compatible saddle support and adapter is aligned with said center line of said launch pad.

5. A universal erection and processing system as set forth in claim 3, in which:
said launch vehicle erection structure includes vertically movable platforms which may be positioned at any height along and around an outer surface of said launch vehicle.

6. A universal erection and processing system as set forth in claim 4, in which:
said launch vehicle erection structure includes vertically movable platforms which may be positioned at any height along and around an outer surface of said launch vehicle.

7. A universal erection and processing system as set forth in claim 5, in which:
said movable platforms include hinged sections that fit about said launch vehicle.

8. A universal erection and processing system as set forth in claim 6, in which:
said movable platforms include hinged sections that fit about said launch vehicle.

9. A universal erection and processing system as set forth in claim 2, which includes:
an umbilical tower,
said umbilical tower includes movable platforms which may be raised and lowered to any height of said launch vehicle,
said platforms include double rotational access arms which are movable toward and away from said launch vehicle.

10. A universal erection and processing system as set forth in claim 3, which includes:
an umbilical tower,
said umbilical tower includes movable platforms which may be raised and lowered to any height of said launch vehicle,
said platforms include double rotational access arms which are movable toward and away from said launch vehicle.

11. A universal erection and processing system as set forth in claim 4, which includes:
an umbilical tower,
said umbilical tower includes movable platforms which may be raised and lowered to any height of said launch vehicle,
said platforms include double rotational access arms which are movable toward and away from said launch vehicle.

12. A universal erection and processing system as set forth in claim 5, which includes:
an umbilical tower,
said umbilical tower includes movable platforms which may be raised and lowered to any height of said launch vehicle,
said platforms include double rotational access arms which are movable toward and away from said launch vehicle.

13. A universal erection and processing system as set forth in claim 6, which includes:
an umbilical tower,
said umbilical tower includes movable platforms which may be raised and lowered to any height of said launch vehicle,
said platforms include double rotational access arms which are movable toward and away from said launch vehicle.

14. A universal erection and processing system as set forth in claim 9, which includes:
powered umbilical support arms for supporting an umbilical.

15. A universal erection and processing system as set forth in claim 14, which includes an elevator that runs the entire height of said umbilical tower.

16. A universal erection and processing system as set forth in claim 1, which includes:
control means for controlling said drive trucks of said gantry to drive said gantry in a horizontal direction as said launch vehicle erection structure is lifted by said cable in order to maintain said lift cable in a vertical line.

17. A method of preparing a universal erection system for launching any type of space launch vehicle comprises:
preparing an adapter frame for a specific type of launch vehicle and supporting said adapter frame on an erection structrue,
preparing a saddle support to have an arcuate configuration compatible with an outer surface of said specific type of launch vehicle for mounting on said adapter frame,
preparing said saddle support and adapter frame with a width and height so that said specific launch vehicle mounted on said saddle support will have a center line which is common with any type of launch vehicle mounted on said launch vehicle erection structure,
positioning said launch vehicle erection structure with one end juxtaposed a launch pad pivotable about a pivot support,
positioning said specific type of launch vehicle onto said saddle support and adapter structure,
positioning said saddle support and adapter frame structure onto said launch vehicle erection structure,
securing a unique structured launching mount adapter onto said launch vehicle,
lifting said launch vehicle erection structure by one end by a gantry crane while pivoting said launch vehicle erection structure about its pivot end,
whereby said particular launch vehicle and launch mount adapter is positioned on a launch pad juxtaposed an umbilical tower with the center line of said launch vehicle in common with the center line of the launch pad.

18. A method as set forth in claim 17, which comprises:
moving said gantry crane simultaneously with lifting said launch vehicle erection structure so that a lift cable of said gantry crane is always vertical.

19. A method as set forth in claim 18, which comprises:
adjusting mobile platforms on said launch vehicle erection structure relative to said launch vehicle for supporting personnel during preparation of the launch vehicle for launch.

20. A method as set forth in claim 19, which comprises:

adjusting mobile platforms on said umbilical tower relative to said launch vehicle, and
adjusting double rotation access arms secured on said platforms to gain access to said launch vehicle from said umbilical tower.

21. A method as set forth in claim 20, which comprises:
adjusting powered umbilical support arms in order to support umbilical lines attachable to said launch vehicle.

* * * * *